United States Patent
Wilkinson

(10) Patent No.: US 9,321,318 B2
(45) Date of Patent: Apr. 26, 2016

(54) SUPPORT ELEMENT

(71) Applicant: Gary P. Wilkinson, Clinton, OH (US)

(72) Inventor: Gary P. Wilkinson, Clinton, OH (US)

(*) Notice: Subject to any disclaimer, the term of this patent is extended or adjusted under 35 U.S.C. 154(b) by 539 days.

(21) Appl. No.: 13/706,934

(22) Filed: Dec. 6, 2012

(65) Prior Publication Data

US 2013/0091640 A1   Apr. 18, 2013

Related U.S. Application Data

(62) Division of application No. 12/619,017, filed on Nov. 16, 2009, now Pat. No. 8,347,928.

(60) Provisional application No. 61/116,316, filed on Nov. 20, 2008.

(51) Int. Cl.
*E01D 19/00* (2006.01)
*B60G 11/02* (2006.01)
*B27L 7/00* (2006.01)

(52) U.S. Cl.
CPC . *B60G 11/02* (2013.01); *B27L 7/00* (2013.01); *E01D 19/00* (2013.01)

(58) Field of Classification Search
CPC ........ E01D 1/005; E01D 19/00; B60G 11/02; B27L 7/00
USPC ........................................ 14/25, 26
See application file for complete search history.

(56) References Cited

U.S. PATENT DOCUMENTS

| | | | |
|---|---|---|---|
| 15,823 A * | 9/1856 | Rogers | 14/24 |
| 125,128 A * | 4/1872 | Fovargue | 14/25 |
| RE6,444 E * | 5/1875 | Eads | 14/25 |
| 565,020 A * | 8/1896 | Newburg | 14/25 |
| 1,356,025 A * | 10/1920 | Thomas | 52/89 |
| 1,457,966 A | 6/1923 | Eastman | |
| 1,598,695 A | 9/1926 | Anderson | |
| 1,606,253 A | 11/1926 | McColgan | |
| 1,666,795 A | 4/1928 | Schmidt | |
| 1,965,136 A | 7/1934 | Crume | |
| 2,505,342 A * | 4/1950 | Schaaf | B28B 1/0873 249/160 |
| 3,077,214 A | 2/1963 | Brukner | |
| 3,588,971 A * | 6/1971 | Lipski | B28B 7/08 249/137 |
| 3,872,903 A | 3/1975 | Carr | |
| 3,937,260 A | 2/1976 | Anderson | |
| 4,076,062 A | 2/1978 | Kanik | |
| 4,103,724 A | 8/1978 | Braid | |
| 4,141,396 A | 2/1979 | McCallister | |
| 4,157,105 A | 6/1979 | Gansley | |
| 4,303,112 A | 12/1981 | Sconce | |
| 4,314,591 A | 2/1982 | Pierrat | |

(Continued)

*Primary Examiner* — Raymond W Addie
(74) *Attorney, Agent, or Firm* — Brouse McDowell; Michael G. Craig

(57) ABSTRACT

Provided is a wood splitter having a support element, a first elongated element, a second elongated element, and wood splitting components. A support element may be a first elongated element and a second elongated element engaged to the first elongated element. The first elongated element may be subject to a first pre-stress load. The first pre-stress load may be a first moment. The second elongated element may be engaged to the first elongated element and may be subject to a second pre-stress load. Wood splitting components may be engaged with at least one of a first elongated element or a second elongated element, may be adapted to operate to split wood, and may be adapted to apply an operational load during operation to the first elongated element. The operational load may at least partially relax the first moment.

2 Claims, 8 Drawing Sheets

(56) References Cited

U.S. PATENT DOCUMENTS

| | | | | |
|---|---|---|---|---|
| 4,378,825 | A | 4/1983 | Schroeder | |
| 4,378,826 | A | 4/1983 | Beach | |
| 4,416,313 | A | 11/1983 | Seeger | |
| 4,498,293 | A | 2/1985 | Gregory | |
| 4,615,366 | A | 10/1986 | Scarbrough, Jr. | |
| 4,679,607 | A | 7/1987 | Bradley | |
| 4,691,399 | A * | 9/1987 | Kim et al. | 14/2 |
| 4,704,754 | A * | 11/1987 | Bonasso | 14/20 |
| 4,709,456 | A * | 12/1987 | Iyer | E04C 3/10 14/74.5 |
| 4,842,030 | A | 6/1989 | Meyer | |
| 5,460,211 | A | 10/1995 | Minati | |
| 5,553,439 | A * | 9/1996 | Grossman | E01D 21/06 14/73 |
| 5,655,347 | A * | 8/1997 | Mahieu | 52/639 |
| 6,076,576 | A | 6/2000 | Maddox | |
| 6,092,572 | A | 7/2000 | Green | |
| 6,138,309 | A * | 10/2000 | Tadros et al. | 14/25 |
| 6,390,160 | B2 | 5/2002 | Pitkaneimi | |
| 6,749,178 | B1 | 6/2004 | Loughner | |
| 6,892,410 | B2 * | 5/2005 | Tokuno et al. | 14/14 |
| 7,104,295 | B2 | 9/2006 | Heikkinen | |
| 7,134,464 | B2 | 11/2006 | Walker | |
| 7,334,615 | B2 | 2/2008 | Paradise | |
| 7,600,283 | B2 * | 10/2009 | Nelson | E01D 2/00 14/77.1 |
| 7,814,945 | B2 | 10/2010 | Babcock | |

* cited by examiner

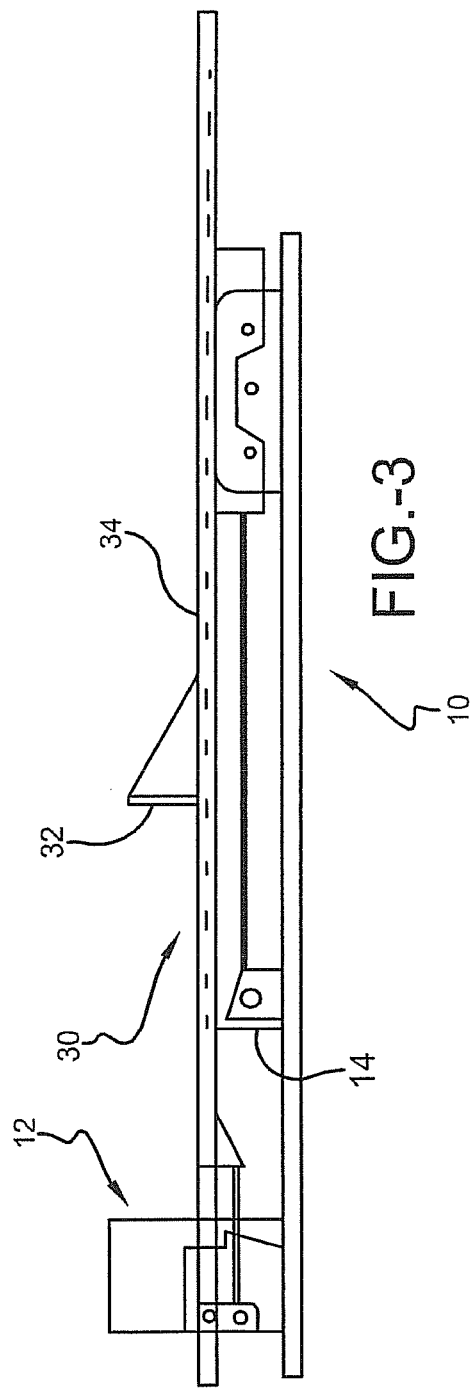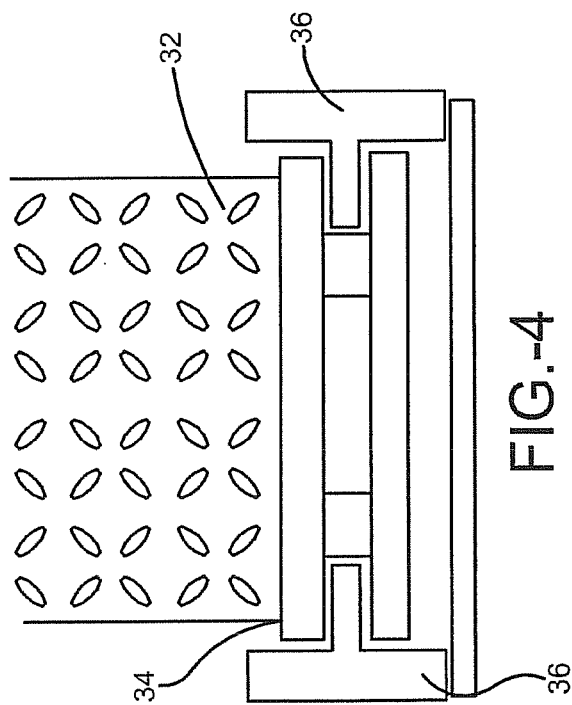

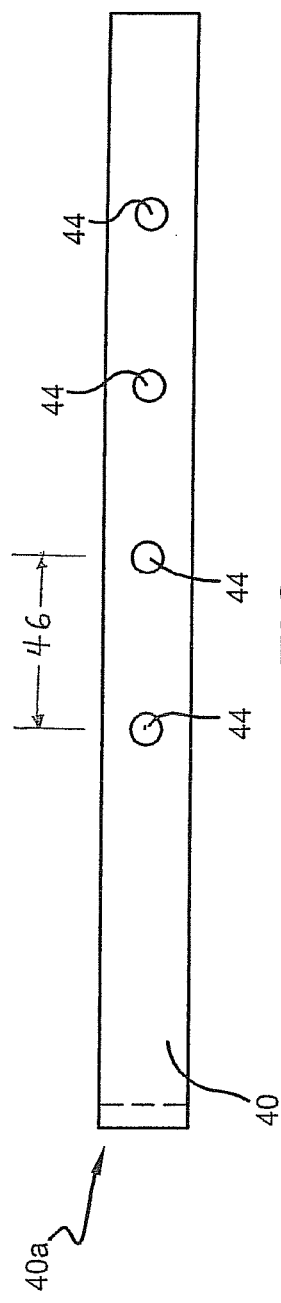
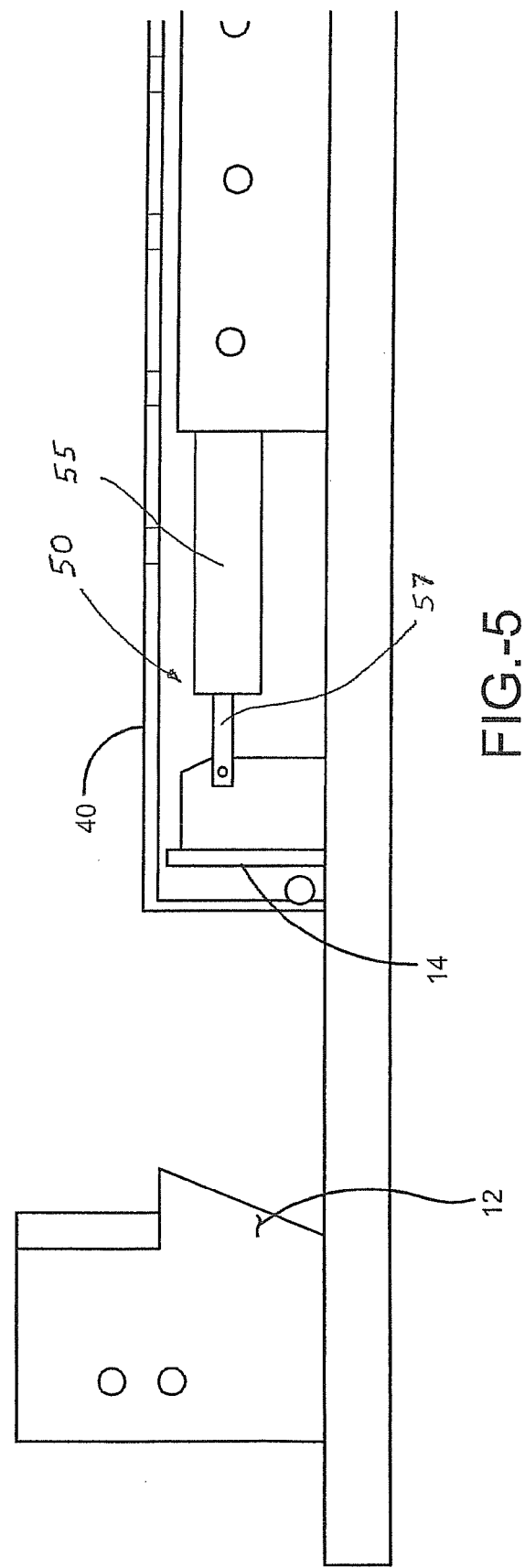

SUPPORT ELEMENT

This application is a divisional of U.S. Ser. No. 12/619,017, titled SUPPORT ELEMENT, filed Nov. 16, 2009, which is incorporated herein by reference, and which claims priority to U.S. Ser. No. 61/116,316, titled WOOD SPLITTER, filed Nov. 20, 2008, which is incorporated herein by reference.

TECHNICAL FIELD

Provided is a support element. More specifically, provided is a support element comprising components having pre-stressed elements that relax during loading of the support element. Further provided are machines, mechanisms, and frames comprising a support element.

BACKGROUND

Machines, mechanisms, and frames are very common. It is also common for the support elements of machines, mechanisms, and frames to be exposed to substantial loads. Exposure to substantial loads militate the support elements of machines, mechanisms, and frames be capable of withstanding substantial loads without mechanical failure.

Unless otherwise noted, as it is used herein, "mechanical failure" is any sort of deformation, including but not limited to, breakage, bending, twisting, fracture, yielding, buckling, necking, or cracking, that substantially diminishes the capability of a support element to perform the function desired of it. Not all deformation is mechanical failure; some elastic deformation is unavoidable and some elastic deformation is to be expected during loading of any real support element.

For a support element formed of a given material, the capacity to withstand a given load is a function of, among other factors, the cross-sectional area of the load bearing element. One common way to increase the capacity of the loads that a support element can withstand without mechanical failure is to increase the cross-sectional area of the load bearing element by increasing the size of the support element.

Increasing the size of a support element often adds cost. It remains desirable to provide relatively inexpensive support element which are capable of withstanding large loads without mechanical failure.

SUMMARY

Provided is a wood splitter. A wood splitter may comprise a support element, a first elongated element, a second elongated element, and wood splitting components. A support element may comprise a first elongated element and a second elongated element engaged to said first elongated element. The a first elongated element may be subject to a first pre-stress load. The first pre-stress load may comprise a first moment. The a second elongated element may be engaged to the first elongated element and may be subject to a second pre-stress load. Wood splitting components may be engaged with at least one of a first elongated element or a second elongated element, may be adapted to operate to split wood, and may be adapted to apply an operational load during operation to the first elongated element. The operational load may at least partially relax the first moment.

Further provided is a vehicle suspension. A vehicle suspension may comprise a support member engaged with a vehicle, a first component engaged to said support member, a second component engaged to said first component, and wherein, during operation of said vehicle, said vehicle is adapted to apply an operational load to the first component, and wherein said operational load at least partially relaxes the first moment. A first component may comprise a first elongated beam adapted to undergo substantial deflection in a substantially elastic manner, a first engagement element, and a third engagement element. The first component may be subject to a first pre-stress load, wherein the first pre-stress load comprises a first moment and wherein said first moment tends to bend the first elongated beam into an arcuate form. The second component may comprise a second elongated beam adapted to undergo substantial deflection in a substantially elastic manner, a second engagement element, engaged to the first engagement element by a first connection, and a fourth engagement element, engaged to the third engagement element by a second connection. The second component may be subject to a second pre-stress load.

Further provided is a bridge for supporting traffic. The bridge may comprise a first component, and a second component engaged to said first component. The first component may comprise a first elongated beam adapted to undergo substantial deflection in a substantially elastic manner a first engagement element, and a third engagement element. The first component may be subject to a first pre-stress load, wherein the first pre-stress load comprises a first moment, and wherein the first moment tends to bend the first elongated beam into an arcuate form. The second component may comprise a second elongated beam adapted to undergo substantial deflection in a substantially elastic manner, a second engagement element, engaged to the first engagement element by a first connection, and a fourth engagement element, engaged to the third engagement element by a second connection. The second component may be subject to a second pre-stress load. During loading of the bridge by traffic, an operational load may be applied to the first component. The operational load may at least partially relax the first moment.

BRIEF DESCRIPTION OF THE DRAWINGS

FIG. 3 shows a side elevation of a wood splitter with an adapter.
FIG. 4 shows a cross-section of a portion of an adapter.
FIG. 5 shows a side view of a portion of a wood splitter with an adapter.
FIG. 6 shows an elongated connecting member.

DETAILED DESCRIPTION

Figure 1:
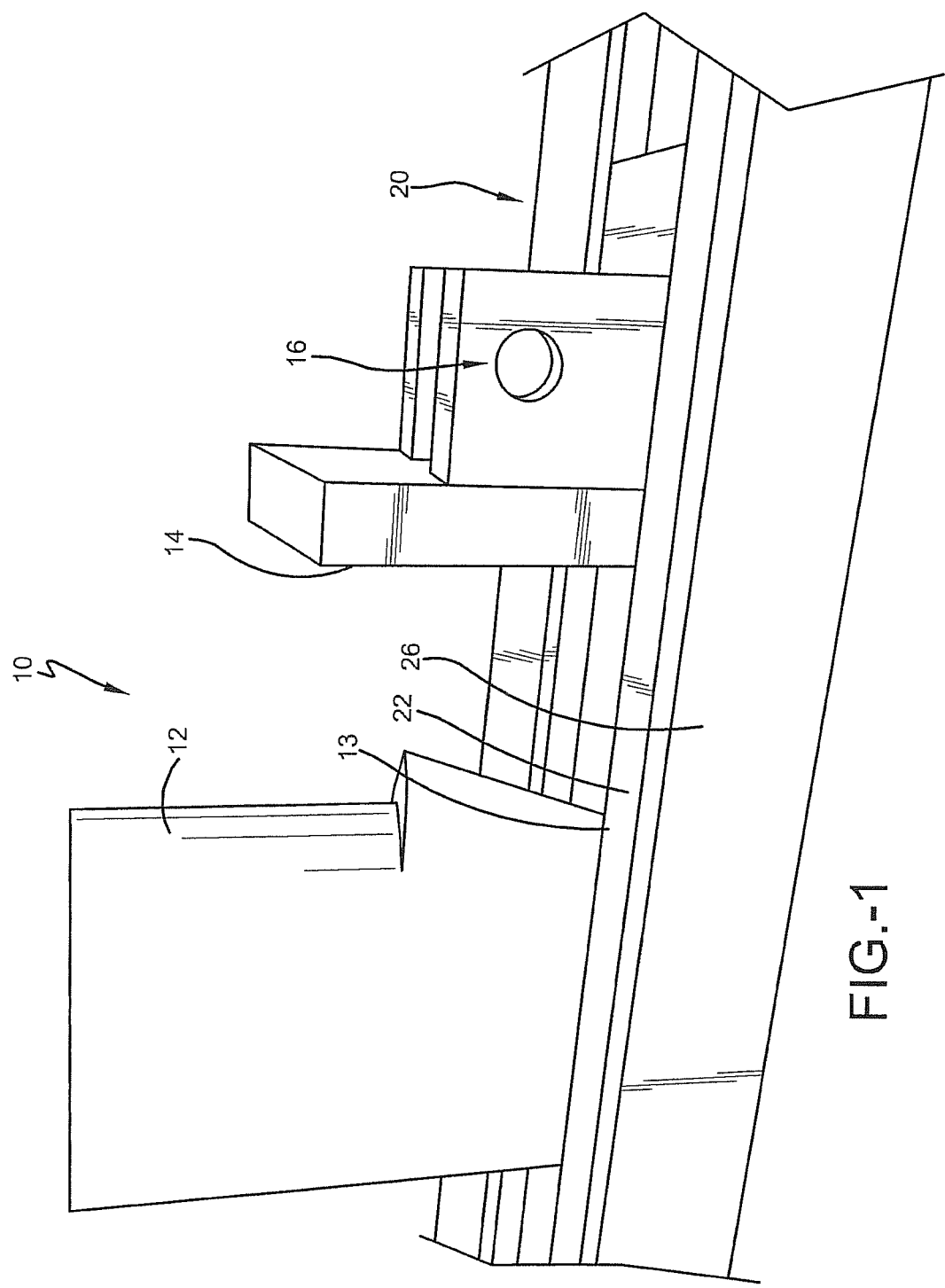
FIG. 1 shows a side view of a portion of a wood splitter.

Machines, mechanisms, and frames may include any sort of machines, mechanisms, and frames. Without limitation, the category of machines, mechanisms, and frames comprises wood splitters, mechanical clocks, vehicle suspensions, and bridges. As used herein, unless otherwise noted, the elements of machines, mechanisms, and frames that are adapted to support loads as part of their function are "support elements".

The support elements of machines, mechanisms, and frames may be subject to substantial loads. Substantial loads to which they are subject militate that the support elements be capable of withstanding substantial loads without mechanical failure.

As used herein a load may comprise, a compressive force, a tensile force, a shear force, a positive moment, a negative moment, a twist, and combinations thereof. Support elements may be subject to many kinds of loads including, without limitation, those comprising a compressive force, a tensile force, a shear force, a positive moment, a negative moment, a twist, and combinations thereof.

Without limitation, a support element may be comprised of cast components, extruded components, injection molded components, forged components, and combinations thereof. A support element may be comprised of metals, ceramics, polymers, cementitious materials, glasses, or other materials. Metals may comprise iron, iron alloys, steel alloys, stainless steel alloys, aluminum, aluminum alloys, bronze alloys, brass alloys, copper, copper alloys, and combinations thereof.

In certain embodiments support elements comprise members selected from the group comprising I-beams, square beams, rectangular beams, channels, angles, plates, tubes, straps, rods, and combinations thereof. A support element may comprise materials selected from the group comprising metal, wood, concrete, polymers, and combinations thereof. In certain embodiments, a support element comprises steel materials.

Many common engineering components have no or very little residual stress in their rest state. Unless otherwise noted, as used herein "rest state" will refer to the state of a support element in a machine, mechanism, or frame, such as, without limitation, a wood splitter, bridge or suspension, and its sub-components when the machine, mechanism, or frame is not in operation, use, or under a load. By way of comparison when a machine, mechanism, or frame, such as, without limitation, a wood splitter, bridge or suspension, is in operation, use, or under a load, operational loads or dynamic loads may appear in a support element of the machine, mechanism, or frame that are absent at the rest state.

It is possible to pre-stress components such that they bear a substantial amount of stress while in their rest state. This can be done by means including but not limited to, engaging a first stressed component to one or more other components such that the first stressed component is prevented from relaxing by the other components. In first non-limiting example, an arced component, that is, a component which is arcuate when fully relaxed, may be elastically deformed and engaged to a flat component such that at least some of the elastic deformation of the arced component is prevented from relaxing by the engagement. In second non-limiting example, a rod may be engaged with a tube such that the rod is in tension and the tube is in compression. In this second example, both the rod and the tube become pre-stressed components by the described arrangement.

Engagement of components may be by any acceptable engineering means. Acceptable means include, but are not limited to, welding, bolting, pinning, and brazing. Acceptable means may also include engagement by means of pre-stress loads as described herebelow.

It is not unusual for pre-stressed components to be engaged with other pre-stressed components or to induce stress in components with which they are engaged. In certain embodiments the pre-stress in pre-stressed components are reactions to pre-stress in other pre-stressed components. A pre-stress created by reaction will be of substantially the same magnitude but opposed to pre-stress creating it. In one non-limiting example, a compressive pre-stress of 3 kN in a concrete slab may be created by a tensile pre-stress of 3 kN in a tensioning cable. Because different materials have different material properties, including but not limited to different tensile strengths, different compressive strengths, and different shear strengths, in certain embodiments one or more pre-stressed components can provide the desired performance properties more cheaply than one or more non-pre-stressed components.

Pre-stressed components may be used in support members to withstand greater loading than would larger and/or more expensive, non-pre-stressed components. In one non-limiting example, given an engineering requirement that an acceptable component not yield during operation and an operational load of 250 kN in tension, a non-pre-stressed component formed of material with a yield strength of 250 MPa would have to have a minimum cross-section of 10 cm$^2$ to withstand the operational load acceptably. By way of comparison, in a second non-limiting example, given the same engineering requirement that an acceptable component not yield during operation and the same operational load of 250 kN in tension, a pre-stressed component having a compressive preload of 125 kN and formed of the same material, would have to have a minimum cross-section of 5 cm$^2$, half the area of the non-pre-stressed component, to withstand the operational load acceptably.

As noted above, wood splitters are machines which may comprise a support element. Wood splitters are common tree-product processing machines. A wood splitter is a collection of components that operate to split wood. The wood can comprise logs or tree trunks or branches or other wood to be split for firewood or fence rails or some other purpose. The loads used in wood splitting operations can be quite large. It is not unusual for wood splitters to apply loads in excess of 30 tons. Large loads militate the support elements of a wood splitter be capable of withstanding large loads without mechanical failure.

Wood splitters typically have a predetermined limit to the length of the piece to be split. Because rails are typically substantially longer than pieces of firewood, log splitters sometimes have a predetermined limit to the length of the piece to be split which is much shorter than that typical to rail splitters. A wood splitter may include an adapter to allow a reciprocating wood splitter to be used for splitting pieces of wood such as, without limitation, rails which are longer than the existing stroke length.

Referring now to FIGS. 1-7, FIG. 1 shows a wood splitter 10 engaged with a support element 20. The wood splitter 10 comprises wood splitting components comprising, without limitation, a wedge 12 and a push plate 14. The support element 20 comprises a first elongated element 22 and a second elongated element 26. Without limitation, the wedge 12 may be engaged with the first elongated element 22 by a weld 13. Other means for engaging components, such as mechanical fasteners, or brazing, may also be acceptable. The push plate 14 is slidably engaged with the first elongated element 22. The push plate 14 comprises an engagement feature 16 by which loads may be applied by a motion imparting element 50 in order to slide the push plate 14 toward the wedge 12, optionally, along with wood to be split (not shown) therebetween. A motion imparting element 50 may comprise a static element 55 and a dynamic element 57, where the dynamic element 57 moves with respect to the static element 55. A motion imparting element may comprise a member selected from the group consisting of a hydraulic press, a pneumatic press, a screw, a motor, and an engine. In certain embodiments, the engagement feature 16 may comprise a hole, a pin, a shaft, a flange, a plate, an abutment, or a key.

A support element can support or engage directly or indirectly other elements of the wood splitter. In certain non-limiting embodiments, a wood splitter may comprise a support element 20 which holds a wood splitting wedge 12 in a desired position relative to a motion imparting element 50. In general, a support element 20 such as the one shown in FIG. 1, may be designed to withstand compressive, tensile, and/or shear loads equal to or greater than those expected during operation of the wood splitter 10.

A push plate 14 may be any component which can load wood pieces to be split against the wedge 12. The push plate 14 is not limited to planar or substantially planar components. In certain embodiments the push plate 14 may comprise a plate, a wedge, a cone, a pyramid, or combinations thereof.

The force required to split the wood (not shown) will deliver equivalent reaction forces to the wedge 12 and to the push plate 14. That is, whatever force is applied to the wood (not shown) as the push plate 14 and the wedge 12 are forced together, an equivalent opposing force is applied by the wood (not shown) to the wedge 12 and the push plate 14. Stated another way, in operation, the push plate 14 and the wedge 12 act to do positive work on the wood (not shown) while the wood (not shown) does negative work on the push plate 14 and the wedge 12. Accordingly, the wedge 12 and the push plate 14 must be engaged to some form of guide or frame or structure or support element 20 capable of holding the wedge 12 and the push plate 14 substantially in place or moving them against the forces applied to them during operation of the wood splitter 10. In certain embodiments the wood splitter 10 comprises a support element 20 adapted to hold some of the components comprising the wood splitter 10 substantially in place relative to one another. In certain embodiments the wedge 12 and the push plate 14 are engaged to a support element 20 to hold the wedge 12 and the push plate 14 substantially in place relative to one another against the forces applied to them during operation of the wood splitter 10.

Without limitation, an example of operational forces in a mechanized device are the operational loads which are exerted on the wedge 12 and push plate 14 of a wood splitter 10 during operation.

Figure 2:
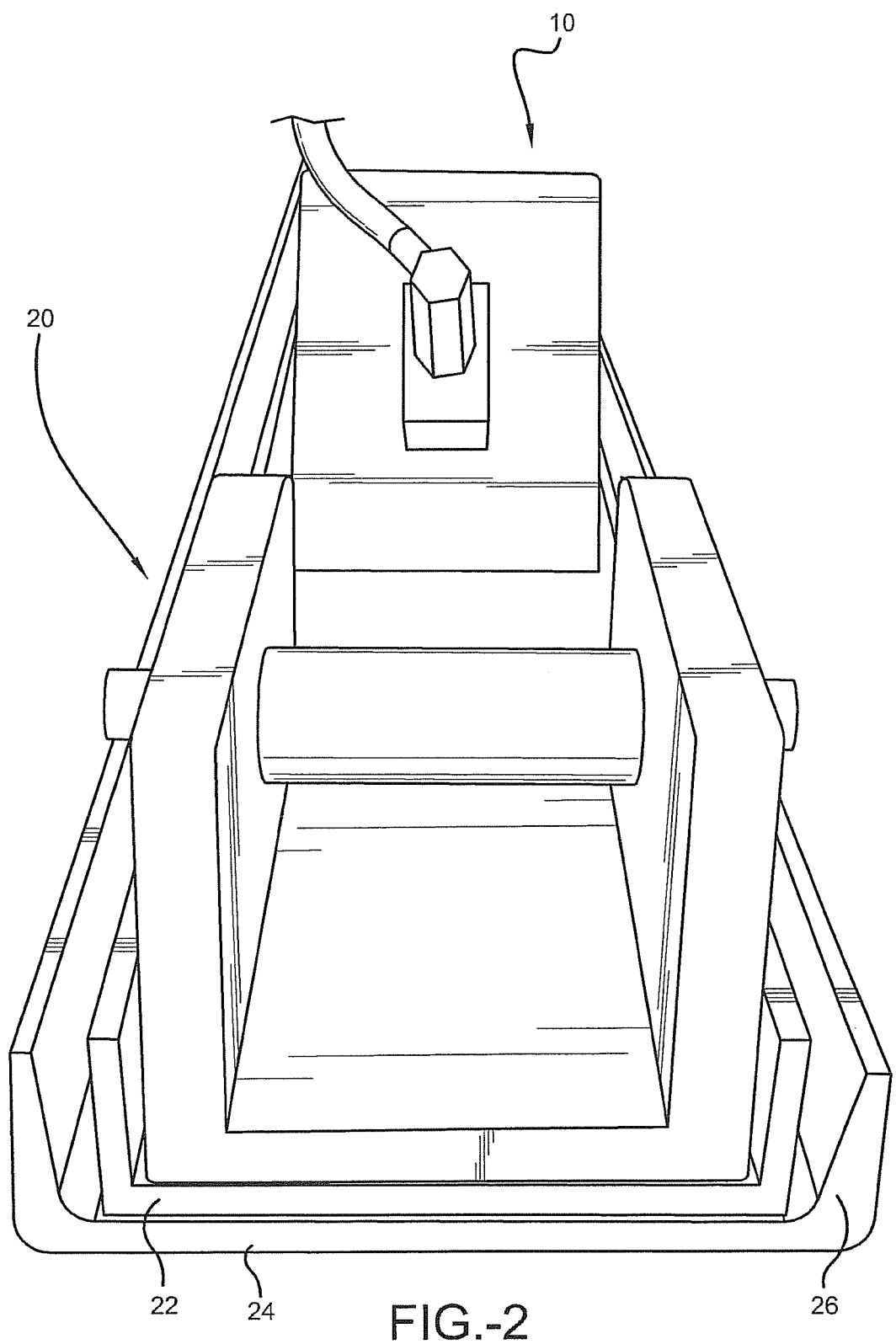
FIG. 2 shows an end view of a portion of a wood splitter.
Figure 7:
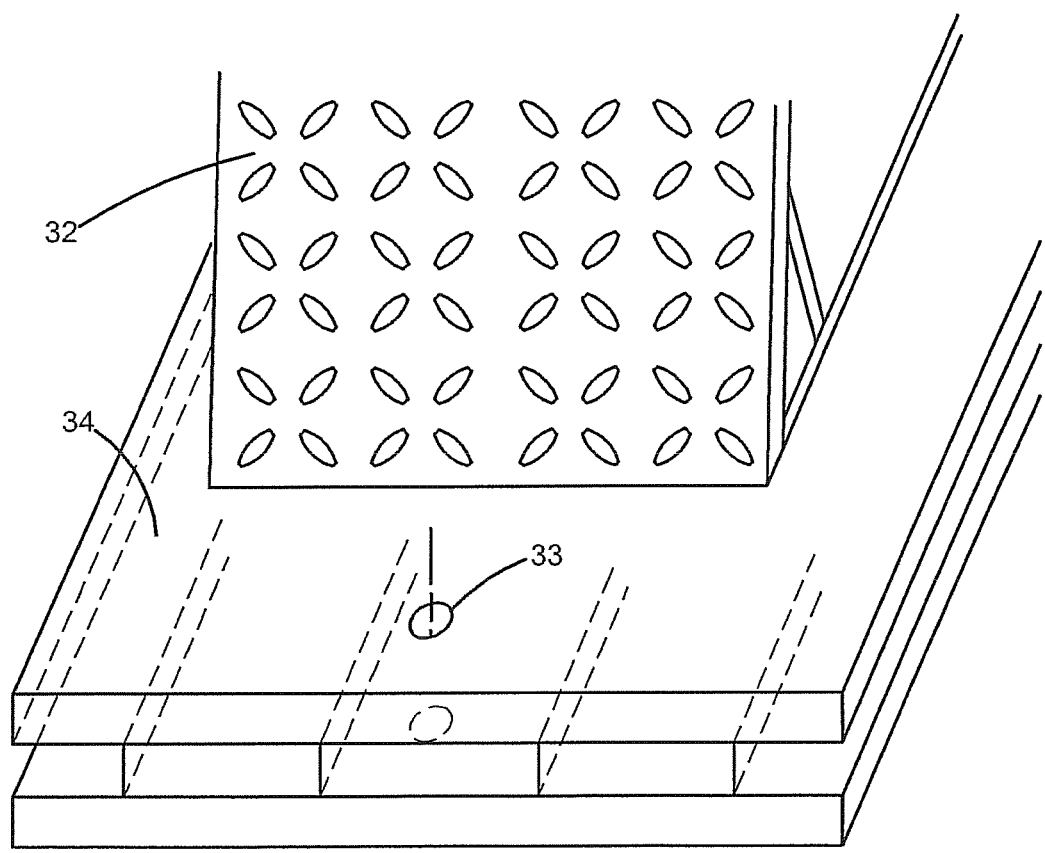
FIG. 7 shows a perspective view of a cross-section of a portion of an adapter.

FIG. 2 shows a wood splitter 10 engaged with a support element 20. The support element 20 comprises a first elongated element 22 and a second elongated element 26. Without limitation, first elongated element 22 and a second elongated element 26 may be engaged by a weld 24. A corresponding weld (not shown) may engage the other ends of the first elongated element 22 and a second elongated element 26. As noted above, other engagement means in the alternative to or in combination with welds may be equally acceptable. In certain embodiments, a first elongated element may be subject to a substantial pre-stress load. In the embodiments shown, without limitation, the first elongated element 22 is arcuate when full relaxed but is pulled into a flatter, prestressed state by engagement with second elongated element 26. In the orientation in which it is shown, the relaxed state of the first elongated element 22 is concave downward. In certain embodiments, without limitation, the first elongated element 22 may be subject to a pre-stress load comprising a moment. In certain embodiments, without limitation, the first elongated element 22 may be subject to a pre-stress load comprising a moment in excess of 1 kN-m, in excess of 5 kN-m, in excess of 10 kN-m, or in excess of 20 kN-m.

During operation, the first elongated element 22 will be subjected to operational loading opposite that of its pre-stress loading. That is, the wedge 12 and the push plate 14, being above the support element 20 will be subject to forces which will apply a negative moment to the support element 20. The negative moment will tend to bend the support element 20 in a downward concave curve. That is, the addition of the operational loading to the support element 20 will cause the first elongated element 22 to relax into a shape more similar to that of its fully relaxed arcuate concave downward shape. That is, during conventional operation, as the other elements of the wood splitter assembly such as, without limitation, second elongated element 26 are subjected to operational loads during operation, the net stress in the first elongated element 22 will be reduced.

FIGS. 3-7 show a wood splitter adapter 30. The wood splitter adapter comprises an elongated mounting bracket 36, a deck 34, an elongated connecting member 40, discrete connection points 44, and a secondary push plate 32. In certain embodiments, the elongated mounting bracket 36 may be engageable to a support element 20 of a wood splitter. In certain embodiments, the elongated mounting bracket 36 may be engaged to the support member 20 such that the axis of elongation of the elongated mounting bracket 36 is parallel to one or more of the axes of elongation of the first elongated element 22 and a second elongated element 26 comprising support member 20. In certain embodiments, deck 34 may be engaged to a secondary push plate 32 by welding, bolting, brazing, or any other acceptable engagement method. In certain embodiments, deck 34 may be slidably engaged with the elongated mounting bracket 36. In certain embodiments, deck 34 may be adapted to slide along an axis parallel to the axis of elongation of the elongated mounting bracket 36. In certain embodiments, the elongated connecting member 40 may comprise a first end 40a adapted for engagement with the primary push plate 14 and a plurality of discrete connection points 44. In certain embodiments, the elongated connecting member 40 may be slidably engaged with deck 34. In certain embodiments the plurality of discrete connection points 44 are each adapted to engage with an engagement feature 33 of deck 34. In certain embodiments, the engagement of elongated connecting member 40 with deck 34 may be selectable between a slidably engaged state or a releaseably fixed state by the selective engagement of any of a plurality of discrete connection points 44 with the engagement feature 33. Selective engagement of any of a plurality of discrete connection points 44 with the engagement feature 33.

With continued reference to FIGS. 3-7, in one embodiment, without limitation, a wood splitter adapter 30 allows a wood splitter 10 to be used to fully split elongated pieces of wood (not shown) that are longer than the stroke length of the wood splitter 10 along the elongated axis (not shown) of the wood piece (not shown). In one embodiment, without limitation, a wood splitter adapter 30 comprises an adjustable secondary push plate 32 engageable to the existing or primary push plate 14. The secondary push plate 32 may be engaged to the existing or primary push plate 14 with an elongated connecting member 40. The elongated connecting member 40 may comprise a first end 40a adapted for engagement with the primary push plate 14. The elongated connecting member 40 has a plurality of discrete connection points 44 that allow adjustable engagement between the elongated connecting member 40 and the engagement feature 33. In certain embodiments adjustable engagement between the elongated connecting member 40 and the engagement feature 33 may allow the distance between the first end 40a of the elongated connecting member 40 and the secondary push plate 32 to be selected among a plurality of discrete distances. In certain embodiments the discrete connection points 44 comprise adaptations for engagement with mechanical fasteners. The mechanical fasteners may comprise pins, bolts, keys, nuts, clips, clamps, and other mechanical fasteners. The adaptations for engagement with mechanical fasteners may comprise holes for accepting pins, holes for accepting bolts, keyways, shafts, threads, or other adaptations. The discrete connection points 44 may be spaced apart by a distance 46 equal to or less than that of the existing stroke length of the wood splitter 10 making at least some of the above-referenced plurality of discrete distances differ by amounts equal to or less than that of the existing stroke length of the wood splitter 10.

Selection of a first discrete connection point 44 allows the adjustable secondary push plate 32 to be located a sufficient distance from the wedge 12 to accommodate pieces of wood of the desired length. In operation the wood splitter 10 drives the primary push plate 14, and, by engagement, the secondary push plate 32 some distance closer to the wedge 12 where the distance is equal to or shorter than the existing stroke length of the wood splitter 10. The apparatus described in this embodiment can be operated so that there are a plurality of discrete connection points 44 in the region defined by the stroke length. This apparatus may be adapted to perform a cycle comprising the steps of 1) moving primary push plate 14 and, thereby, moving the engaged adapter, secondary push plate 32, and the associated wood piece closer to the wedge 12, 2) breaking the connection at a discrete connection point 44 between the elongated connecting member 40 and the primary push plate 14, 3) moving the primary push plate 14 to a location further from the wedge 12 and closer to the secondary push plate 32, 4) establishing a connection at another discrete connection point 44 between the elongated connecting member 40 and the primary push plate 14.

As noted above, it is also possible to engage components by means of pre-stress forces. In certain non-limiting embodiments, at least one capturable component and at least one captured component are engaged in such a way that at least one of the components must be stretched, stressed, deformed, loaded, or have further energy of deformation somehow added to the component in order to disengage the components. In some embodiments at least one of the components is stretched, stressed, deformed, or otherwise loaded such that it contains energy of deformation and is held in the stretched, stressed, deformed, or otherwise loaded state by one or more other components.

Figure 8:
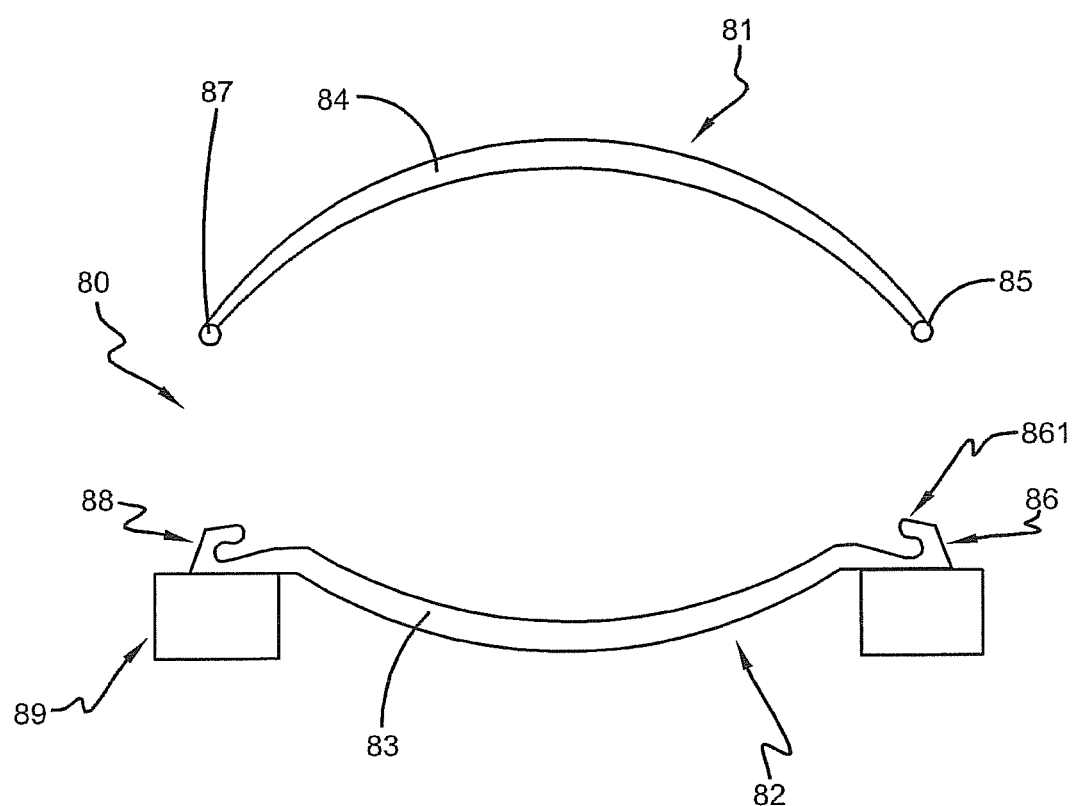
FIG. 8 shows a front view of one embodiment of a support member.
Figure 9:
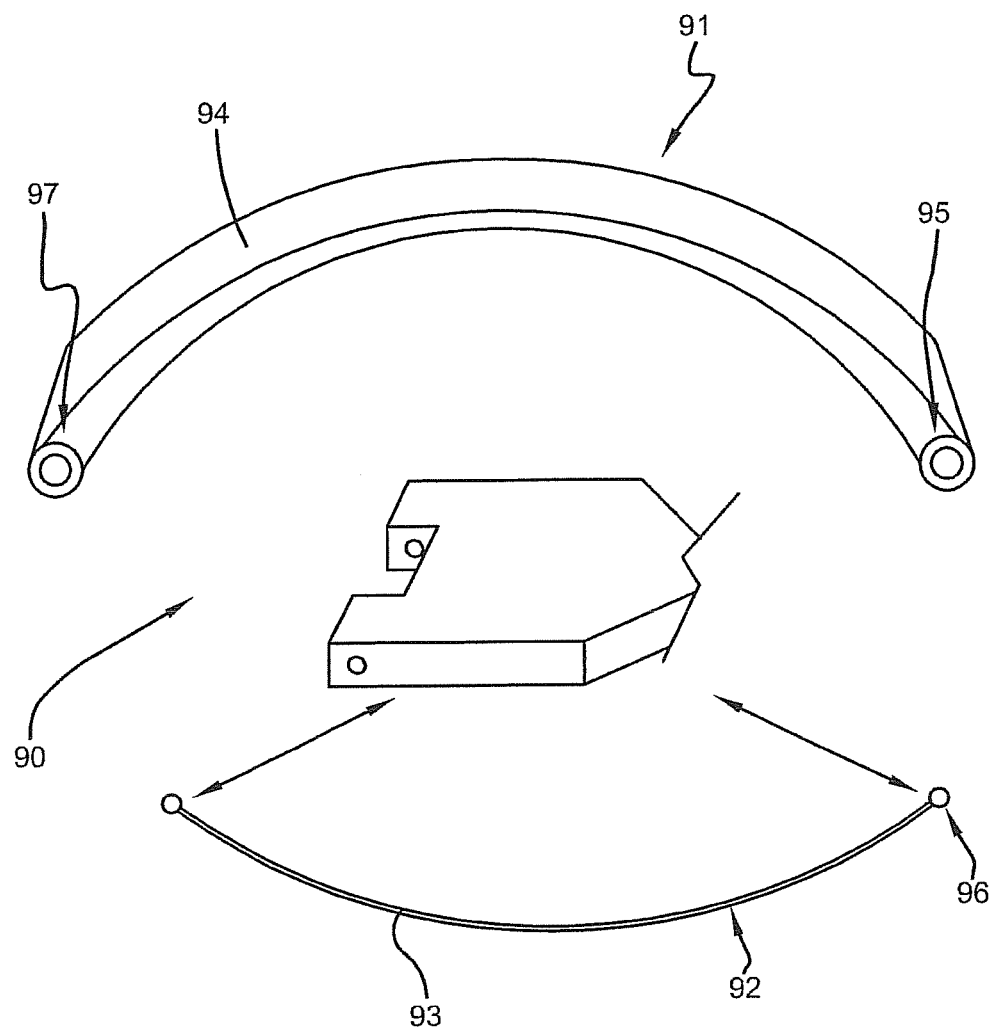
FIG. 9 shows a front view of another embodiment of a support member.

Referring now to FIGS. 8-9, in certain embodiments, and without limitation, a support member 80, 90 may comprise a first component 81, 91 and a second component 82, 92. First component 81, 91 may be elastically deflectable such that it has some of the properties of a spring. In certain embodiments, such as, without limitation, that shown in FIGS. 8-9, first component 81, 91 comprises a first beam 84, 94 adapted to undergo substantial deflection in a substantially elastic manner and a first engagement element 85, 95. Second component 82, 92 is adapted to hold first component 81, 91 in a deflected position. In certain embodiments, first component 81, 91 is adapted to hold second component 82, 92 in a deflected position. Engagement is made by deflecting the first component 81, 91 to produce a reaction force and capturing the first component 81, 91 with a second component 82, 92 such that either the first component 81, 91 or the second component 82, 92 must be further loaded or otherwise acted upon in order to disengage the first component 81, 91 from the second component 82, 92.

In certain embodiments, such as, without limitation, that shown in FIGS. 8-9, second component 82, 92 comprises a second beam 83, 93 and a second engagement element 86, 96. As shown in FIG. 8, and without limitation, the first engagement element 85 may comprise a pin or a shaft and second engagement element 86 may comprise a socket, opening, or other geometry adapted to accept the first engagement element 85. As shown in FIG. 9, and without limitation, the first engagement element 85 may comprise socket, opening, or other geometry adapted to accept a pin, shaft or other mechanical fastener (not shown) and second engagement element 86 may comprise a socket, opening, or other geometry adapted to accept a pin, shaft or other mechanical fastener (not shown).

In certain embodiments, the second engagement element 86 may comprise a flange or other geometry 861 to produce a counter-force in response to the reaction force from 81 and thereby to resist the release or relaxation of the first component 81. In certain embodiments, a flange or other geometry 861 is adapted to produce a counter-force only up to some limit and thereby to resist the release or relaxation of the first component 81 only up to that limit and, in the event that the forces from 81 exceed the limit, to allow 81 to become loose, escape capture, or spring free.

In certain embodiments, without limitation, the first engagement element 85 and the second engagement element 86 may be engaged to one another by one or more connection methods. Connection methods may comprise pinned connections, fixed connections, roller connections, and other form of connection. A pinned connection provides reaction forces to substantially resist translation of the first engagement element 85 and the second engagement element 86 with respect to one another, but allow or produce small resistance to the first engagement element 85 and the second engagement element 86 to rotate with respect to one another. A fixed connection provides reaction forces to substantially resist translation of the first engagement element 85 and the second engagement element 86 with respect to one another, and also provides reaction forces to substantially resist rotation of the first engagement element 85 and the second engagement element 86 with respect to one another. A roller connection may provide reaction forces to substantially resist translation in one or more constrained directions of the first engagement element 85 and the second engagement element 86 with respect to one another, but allows or produce small resistance to the first engagement element 85 and the second engagement element 86 to rotate with respect to one another and to translate with respect to one another in one or more non-constrained directions.

Each of these connection methods can have performance characteristics, like all elements permitted to move with respect to one another, defined by the materials and/or by appropriate selection of bearing components. Bearing components may include, without limitation, frictionless bearings, journal bearings, slide bearings, or other friction modifying components or materials.

In certain embodiments, the first component 81 comprises more than one of the first engagement elements 85, 87. In certain embodiments, the second component 82 comprises more than one of the second engagement elements 86, 88.

Figure 10:
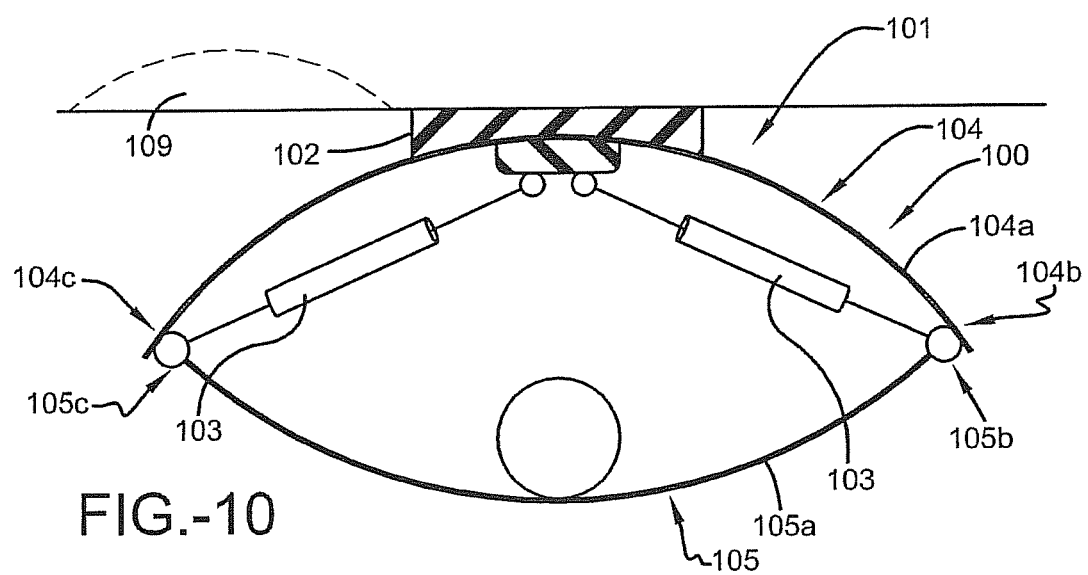
FIG. 10 shows a front view of another embodiment of a support member.

Referring now to FIG. 10, in certain embodiments, a support member 101 may be used as part of a suspension 100 in a vehicle 109. Without limitation, a suspension 100 may be connected to a vehicle 109 by saddle 102 providing compliant engagement geometry between the support member 101 and the vehicle 109. In certain embodiments, a saddle 102 comprises hard rubber, synthetic rubber, other polymers, leather, or other materials selected to provide the desired engagement between the vehicle 109 and the support member 101.

A support member 101 may comprise a first component 104 and a second component 105. First component 104 may be elastically deflectable such that it has some of the properties of a spring. In certain embodiments, such as, without limitation, that shown in FIG. 10, first component 104 comprises a first elongated beam 104a adapted to undergo substantial deflection in a substantially elastic manner and a first engagement element 104b. Second component 105 is adapted to subject said first component 104 to a pre-stress load and to hold said first component 104 in a deflected position. In certain embodiments, the pre-stress load to which the first component 104 is subjected to comprises a first moment. In certain embodiments, first component 104 is adapted to subject said second component 105 to a pre-stress and to hold said second component 105 in a deflected position. Engagement is made by deflecting the first component 104 to produce a reaction force and capturing the first component 104 with a second component 105 such that either the first component 104 or the second component 105 must be further loaded or otherwise acted upon in order to disengage the first component 104 from the second component 105. In certain embodiments, such as, without limitation, that shown in FIG. 10, second component 105 comprises a second elongated beam 105a and a second engagement element 105b. Without limitation, the first engagement element 104b and the second engagement element 105b may engage one another to comprise a pinned connection, a fixed connection, or other form of connection. In some embodiments, in certain embodiments, such as, without limitation, that shown in FIG. 10, first component 104 further comprises a third engagement element 104c and second component 105 comprises a fourth engagement element 105c. Without limitation, the third engagement element 104c and fourth engagement element 105c may engage one another to comprise a pinned connection, a fixed connection, or other form of connection.

Without limitation, a suspension 100 may comprise one or more dampers 103. A damper 103 may comprise a conventional shock absorber, a visco-elastic damper, a hysteretic damper, or any other sort of device that acts to dampen vibratory motion. As shown in FIG. 10, a damper 103, may by an elongated damper engaged with the support member 101 and one or more of first component 104 and a second component 105.

Figure 11:
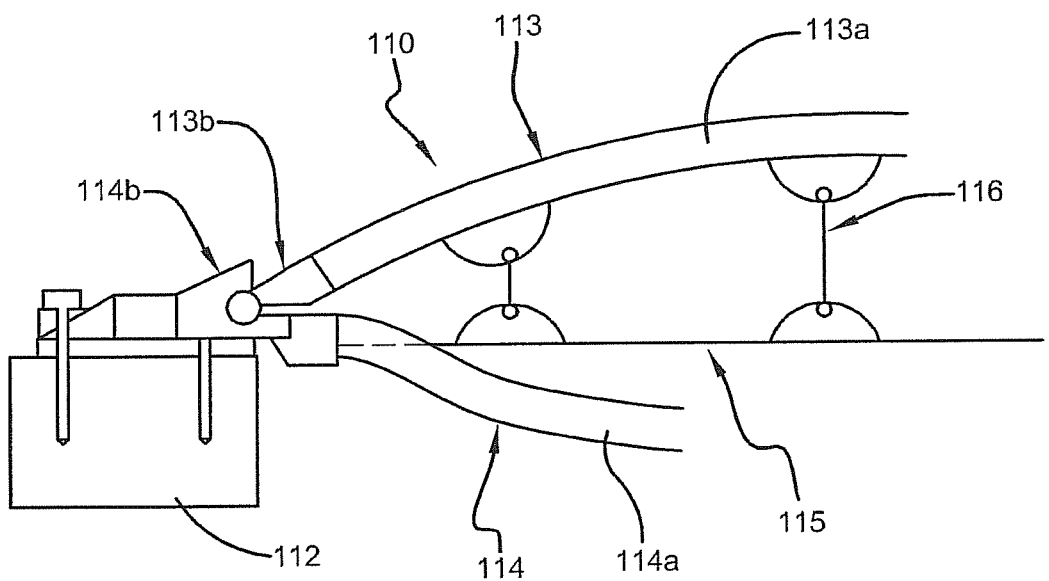
FIG. 11 shows a front view of another embodiment of a support member.

Referring now to FIG. 11, in certain embodiments, a support member 111 may be used as part of a bridge 110. Without limitation, a bridge 110 may be engaged to a foundation 112. In certain embodiments, a bridge 110 may be engaged to a foundation 112 by a fixed connection, a pinned connection, a roller connection, or by another connection.

A support member 111 may comprise a first component 113 and a second component 114. First component 113 may be elastically deflectable such that it has some of the properties of a spring, where elasticity has the traditional engineering meaning of having an ability to resist applied stress and return to an original shape or size when stress is removed; and where deflection has the traditional engineering meaning of the degree to which a structural element is displaced under a stress or load. Therefore, in this example, the first component 113 being elastically deflectable may mean that it has the ability to resist applied stress or load in the amount and direction of the deflection, and return to its original shape and/or size when the stress or load is removed in the amount and direction of deflection. In certain embodiments, such as, without limitation, as shown in FIG. 11, first component 113 comprises a first elongated beam 113a adapted to undergo substantial deflection in a substantially elastic manner and a first engagement element 113b. Second component 114 is adapted to hold first component 113 in a deflected position. In certain embodiments, first component 113 is adapted to hold second component 114 in a deflected position. In this way, in one implementation, as described above, an appropriate load, that will overcome the elasticity of the beam 113a, can be applied to the first elongated beam 113a, causing the beam 113a to deflect (e.g., resulting in a reduced clear span of the arc). Engagement is made by deflecting the first component 113 to produce a reaction force (e.g., stress against the elasticity of the first component 113, or pre-stress once engaged) and capturing the first component 113 with a second component 114 such that either the first component 113 or the second component 114 must be further loaded or otherwise acted upon in order to disengage the first component 113 from the second component 114. In certain embodiments, such as, without limitation, that shown in FIG. 11, second component 114 comprises a second elongated beam 114a and a second engagement element 114b. Without limitation, the first engagement element 113b and the second engagement element 114b may engage one another to comprise a pinned connection, a fixed connection, or other form of connection.

As shown in FIG. 11, the first component 113 is subjected to pre-stressing negative moment by engagement with second component 114. That is, for example, with continued reference to FIGS. 8 and 9, the first elongated beam 113a may be subjected to a negative load (e.g., stress in an opposite direction of expected load during use/operation), where the negative load is sufficient to overcome the elasticity of the beam 113a. In this example, application of the negative loaded can result in deflection of the arcuate beam 113a in the direction of the applied negative load. As described above, when negative load is applied to an arcuate beam, the length of the clear span (e.g., the distance between the end points of the arc) is reduced. In this example, the reduced clear span allows the end points, comprising the first engagement element 113b, to be engaged with the second engagement element(s) 114b disposed on the second component 114. Further, in this example, the distance between the second engagement element(s) 114b is less than the distance between the first engagement element(s) 113b of the first component 113. Therefore, when a sufficient negative load is applied to the first elongated beam 113a, and the first engagement element(s) 113b of the first component 113 are engaged (e.g., as described above in FIGS. 8 and 9) with the second engagement element(s) 114b, disposed on the second component 114, the first elongated beam 113a should remain under the stress of the negative load, thereby creating a pre-stressed condition for the first component. Similarly, in this example, once the first component is engaged with the second component 114, the second component will be disposed in a pre-stressed condition, resulting from the stress applied from the first component, attempting to elastically return to its restful state (e.g., arcuate beam). It will be appreciated that the dimensions of, and/or materials used for, the first and second components 113, 114 can be determined by sound engineering principles, based on the intended use. For example, as described above, an amount of pre-stress force applied to the first component 113 may reduce a size (e.g., cross-section surface area) of the first elongated beam 113a. Further, a steel beam may be able to sustain a greater expected load than a wood beam of similar size. Additionally, a length of the span of a bridge utilizing the systems described herein will dictate the dimensions of and/or material used for the bridge. That is, for example, a short span may merely utilize a single set of first and second components 113, 144 so engaged, as in FIGS. 8, 9, and 11; while a larger span may utilize a plurality of such sets of components 113, 114 so engaged. Such determinations should be made by use of sound engineering skills applied to respective uses.

Without limitation, a bridge 110 may further comprise a deck 115 adapted to support traffic thereupon. A deck 115 may be adapted to support pedestrian traffic, vehicle traffic, animal traffic or other sorts of traffic. In some embodiments, the deck 115 may comprise meshwork. A deck 115 may be engaged to a bridge by engaging it with the first component 113. In certain embodiments, the deck is engaged to first component 113 by suspending or hanging the deck 115 therefrom with one or more suspension elements 116. Suspension elements 116 may comprise cables, wires, rods, straps, ropes, links, bars, or other components. By engaging deck 115 to the first component 113, a downward load on the deck, such as from traffic borne thereupon, may subject the first component 113 to a positive moment. A positive moment will counteract, at least partially, the above noted pre-stress in first component 113. Accordingly, a downward load on the deck may reduce the stress in first component 113.

While the support element has been described above in connection with certain embodiments, it is to be understood that other embodiments may be used or modifications and additions may be made to the described embodiments for performing the same function of the support element without deviating therefrom. Further, all embodiments disclosed are not necessarily in the alternative, as various embodiments may be combined to provide the desired characteristics. Variations can be made by one having ordinary skill in the art without departing from the spirit and scope of the support element. Therefore, the support element should not be limited to any single embodiment, but rather construed in breadth and scope in accordance with the recitation of the attached claims.

The invention claimed is:

1. A bridge for supporting traffic, said bridge comprising, a first component, said first component comprising:
    a first elongated beam adapted to undergo substantial elastic first deflection in a direction opposite of an expected load condition during use, resulting in a first pre-stress load on the first elongated beam,
    a first engagement element fixedly engaged with a first end of the first elongated beam; and
    a third engagement element, fixedly engaged with a second end of the first elongated beam,
a second component comprising:
    a second elongated beam adapted to undergo substantial elastic second deflection in a direction opposite of the first deflection, resulting in a second pre-stress load on the second elongated beam,
    a second engagement element fixedly engaged with a first end of the second elongated beam, and engaged to said first engagement element by a first connection, and
    a fourth engagement element fixedly engaged with a second end of the second elongated beam, and engaged to said third engagement element by a second connection,
    wherein said second component is subject to a second pre-stress load; and
wherein the first pre-stress load tends to bend the first elongated beam into an arcuate form in the direction of the first deflection, and second pre-stress load that tends to deflect the second elongated beam in the direction opposite of the first deflection; and
wherein, during loading of the bridge by traffic, an operational load is applied to the first component, and wherein said operational load at least partially relaxes the first pre-stress load.

2. The bridge of claim 1, wherein said first connection and said second connection comprise pinned connections.

* * * * *